United States Patent [19]

Thurm et al.

[11] 4,217,648

[45] Aug. 12, 1980

[54] METHOD AND APPARATUS FOR EVALUATING COLOR PHOTOGRAPHIC NEGATIVES PRIOR TO COPYING

[75] Inventors: Siegfried Thurm, Voiswinkel; Konrad Bunge, Cologne, both of Fed. Rep. of Germany

[73] Assignee: AGFA-Gevaert, A.G., Leverkusen, Fed. Rep. of Germany

[21] Appl. No.: 951,989

[22] Filed: Oct. 16, 1978

[30] Foreign Application Priority Data

Oct. 22, 1977 [DE] Fed. Rep. of Germany ....... 2747527

[51] Int. Cl.² .............................................. G01J 1/10
[52] U.S. Cl. .................................... 364/526; 356/404; 356/425; 355/88
[58] Field of Search ...................... 364/526, 525, 515; 356/404, 425; 355/88

[56] References Cited

U.S. PATENT DOCUMENTS

| | | | |
|---|---|---|---|
| 3,819,275 | 6/1974 | Aimi et al. | 356/404 |
| 3,876,824 | 4/1975 | Hipwell | 356/404 X |
| 3,943,344 | 3/1976 | Kidode et al. | 364/525 X |
| 4,045,136 | 8/1977 | Watson et al. | 355/88 X |
| 4,090,243 | 5/1978 | Kotera et al. | 364/526 |
| 4,101,216 | 7/1978 | Grossmann | 356/404 X |
| 4,110,826 | 8/1978 | Mollgaard et al. | 364/526 |
| 4,123,778 | 10/1978 | Graf et al. | 364/515 X |

*Primary Examiner*—Edward J. Wise
*Attorney, Agent, or Firm*—Peter K. Kontler

[57] ABSTRACT

The densities of neighboring unit areas of a color photographic negative are measured in each of the primary colors and the results of measurements are compared with each other to ascertain the dimensions and boundaries of negative portions which exhibit dominant colors. Each such portion is considered in the selection of the amounts of copying light to the extent corresponding to a single unit area. The comparison is carried out by a computer which compares the results of measurements of neighboring unit areas, as considered in and at right angles to the direction of movement of the negative relative to the monitoring elements. A result of measurement is disregarded if it deviates from the result of measurement of a neighboring unit area by less than a preselected reference value which may but need not be different for each primary color.

10 Claims, 1 Drawing Figure

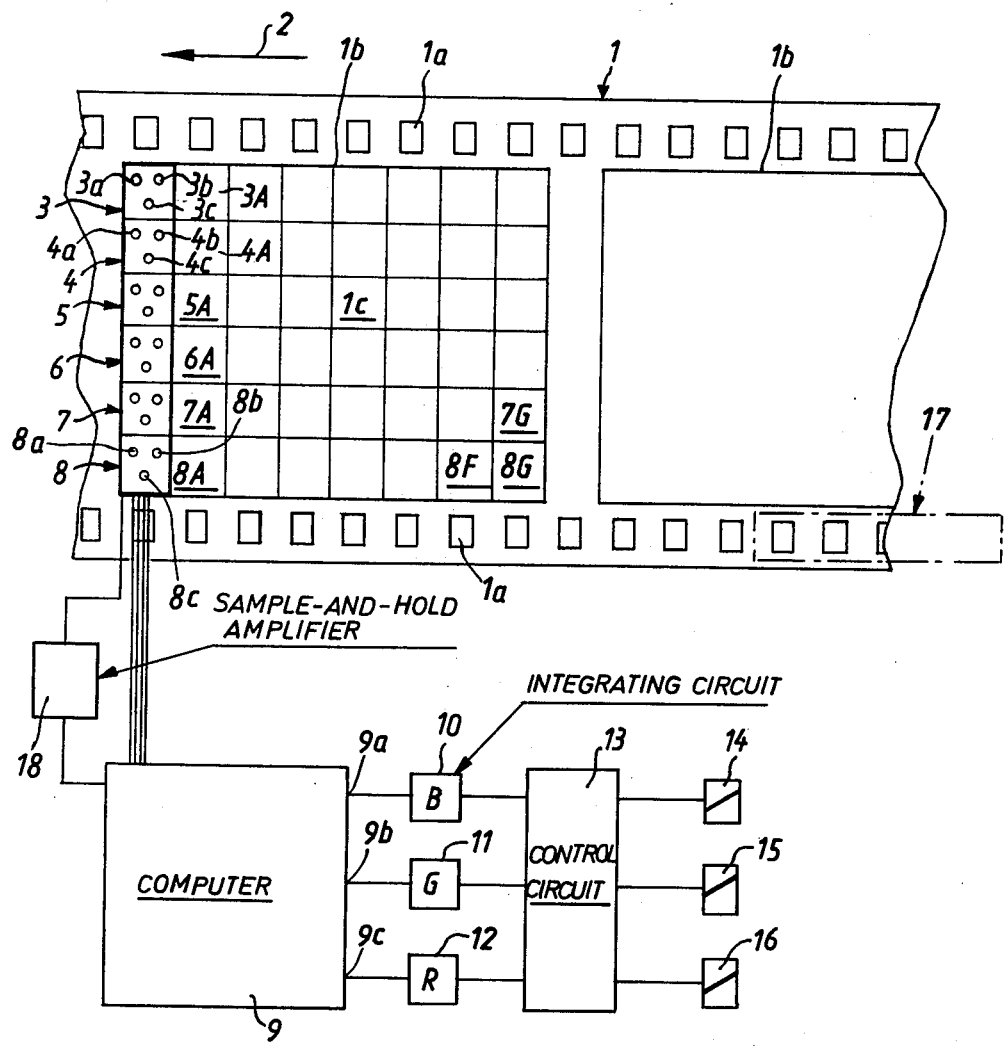

METHOD AND APPARATUS FOR EVALUATING COLOR PHOTOGRAPHIC NEGATIVES PRIOR TO COPYING

BACKGROUND OF THE INVENTION

The present invention relates to a method and apparatus for evaluating photographic color negatives prior to copying. More particularly, the invention relates to a method and apparatus for color analysis of negatives preparatory to integral color printing in order to ascertain the amounts of light in different colors to which a photographic paper or the like must be exposed in order to obtain satisfactory reproductions of color originals.

It is known to photoelectrically scan a color negative in order to ascertain the required quantities of light in each of the primary colors. Many presently known techniques for determination of the quantities of printing light in each of the primary colors are based on the premise that a satisfactory reproduction is obtained if one relies on the neutral grey principle independently of the color composition of the original. This holds true for a large number of originals, as long as an original does not exhibit so-called subject failure, i.e., one or more large areas of dominant color. Conventional proposals involve pronounced suppression of dominant colors by non-uniform evaluation of originals in different colors so that the copy again exhibits a neutral grey. Such proposals are unsatisfactory when a negative exhibits one or more large areas of dominant color.

It was further proposed to ascertain the quantities of copying light in the primary colors by scanning successive fields of a color negative and by attributing less importance to fields which exhibit a pronounced color imbalance, the assumption being that such fields form part of an area of dominant color. Reference may be had to German Offenlegungsschrift No. 2,535,034. The just discussed method exhibits the drawback that it leads to the making of unsatisfactory reproductions when a color negative comprises several areas of dominant color. Thus, the influence of such areas upon the selected quantities of printing or copying light in the primary colors is eliminated or reduced to such an extent that the coloration of the print deviates noticeably from the color composition of the photographed subject or scene. In other words, when the major part of a color negative exhibits one or more dominant colors, the portion of such negative which was evaluated and actually considered in the selection of quantities of copying light is only a small fraction of the entire negative, i.e., such small fraction is not representative of the color distribution of the original.

OBJECTS AND SUMMARY OF THE INVENTION

An object of the invention is to provide a novel and improved method of evaluating color negatives prior to copying in such a way that subject failure cannot result in the making of unsatisfactory or inferior reproductions.

Another object of the invention is to provide a method which insures adequate consideration of areas of dominant color in the selection of copying light for the making of reproductions of color negatives.

A further object of the invention is to provide a method which invariably allows for consideration of a relatively high percentage of the area of a color negative in the selection of copying light in each of the primary colors.

An additional object of the invention is to provide a novel and improved apparatus for the practice of the above outlined method.

Another object of the invention is to provide an apparatus which can be utilized for evaluation of a wide variety of color negatives and which can be combined with or incorporated into existing color copying machines.

One feature of the invention resides in the provision of a method of evaluating color photographic negatives (e.g., exposed and developed frames of color films) prior to integral copying. The method comprises the steps of photoelectrically measuring the color density of each of a plurality of unit areas or fields of a negative in each of the primary colors (the combined area of such fields preferably equals the area of the negative), comparing the results of measurements of neighboring fields in each of the primary colors, storing only one of the results when the difference between the results of measurements of two neighboring fields is below a predetermined value (i.e., when the color density of such neighboring fields is identical or sufficiently close to warrant the discarding of the results of one measurement), and utilizing the stored results for selection of the amounts of light in the respective colors in the course of the copying operation. The predetermined value may be selected as a function of the average grey density of the negative. Furthermore, a different predetermined value can be selected for each of the primary colors.

The storing step may comprise separately storing the results of measurements in each of the primary colors, and the utilizing step may comprise totalizing the stored results in each of the colors in such a way that the sum of colors in the copy or reproduction of those fields whose results of measurement were stored amounts to neutral gray.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic view of an apparatus which embodies one form of the invention and is used for evaluating the color composition of frames of an exposed and developed color film.

DESCRIPTION OF THE PREFERRED EMBODIMENTS

The drawing shows a portion of an exposed and developed color photographic film 1 which comprises a series of frames (negatives) 1b each of which must be evaluated prior to introduction into an integral copying machine which makes reproductions of successive satisfactory frames on photographic paper or the like. The longitudinal marginal portions of the film 1 are provided with rows of perforations 1a which enable sprockets in the photographic apparatus (not shown) to advance the film upon completion of each exposure. Furthermore, such perforations are used to facilitate stepwise transport of film 1 at the evaluating station (shown in the drawing) where the film is caused to move relative to a plurality of photosensitive monitoring or measuring elements 3a to 8c which ascertain the density of relatively small unit areas or fields 1c of each frame 1b in each of the primary colors red, blue and green. One of the sprockets which move the film 1 relative to the evaluating apparatus is shown by phantom lines, as at 17. Each unit area or field 1c is sufficiently small (or the range of each monitoring element is sufficiently large) to insure that each field can be measured in its entirety when such field advances into register with a group of three monitoring elements 3a–3c, 4a–4c, 5a–5c, 6a–6c, 7a–7c or 8a–8c. The direction in which the transporting mechanism including the sprocket 17 advances the film 1 in stepwise fashion is indicated by the arrow 2. The six fields 1c which are in the process of being monitored by the elements 3a–8c are respectively denoted by the reference characters 3, 4, 5, 6, 7 and 8. Thus, the field 3 is monitored by the elements 3a–3e, the field 4 is monitored by the elements 4a–4c, and so forth. The elements a monitor the density of adjacent fields in the primary color blue, the elements b in the primary color green, and the elements c in the primary color red.

The range of each monitoring element depends on the size of its photosensitive surface and on the distance between such surface and the path for the film 1. The latter is illuminated from behind so that light which passes therethrough impinges upon the photosensitive surfaces of the elements 3a–8c. Thus, each of the elements 3a–3c is influenced by all particles of the respective color in the field 3 when the corresponding frame 1b assumes the illustrated position (regardless of the position of elements 3a–3c with respect to the field 3). The same holds true for the elements 4a–8c and the fields 4–8.

Each monitoring element transmits signals (denoting the results of measurements of a field in the respective color) to a discrete storing device (one shown at 18) which may constitute a sample-and-hold amplifier and stores the results of measurement for an interval of time which is long enough to enable a signal comparing computer 9 to complete the necessary comparisons of the results of measurements of neighboring fields (e.g., 3 and 4, 3 and 3A, 4 and 5, 4 and 4A, etc). Each of the aforementioned intervals is longer than the interval of impingement of light upon a monitoring element.

The amplifiers 18 and the monitoring elements 3a–8c are connected with the corresponding inputs of the computer 9 which may constitute a commercially available processor or microprocessor such as that marketed by Digital Equipment Corporation of Maynard, Massachussetts under the designation LSI 11.

The computer 9 operates as follows:

During the initial stage of scanning of the exposed and developed frame 1b, the elements 3a to 8c are in register with the leading marginal zone of the frame 1b, i.e., with the fields 3 to 8. The sample-and-hold amplifiers 18 for all monitoring elements receive and store signals which are transmitted by the respective elements and denote the color density of the scanned fields 3 to 8 in the respective colors. The computer 9 thereupon compares the signal which has been transmitted to the amplifier 18 for the element 3a with the signal which is stored in the amplifier for the element 4a. If the difference between the two signals is less than a predetermined reference value C (denoting, for example, the average density of the entire frame 1b), the output 9a of the computer transmits a signal corresponding to that furnished by the element 3a to an integrating circuit 10 for the primary color blue. In other words, the signal which is transmitted by the element 4a and denotes the density (in blue color) of the corresponding field 4 at the leading marginal zone of the frame 1b is disregarded because its intensity or another characteristic does not deviate sufficiently from the signal which is transmitted by the element 3a. The computer 9 carries out the same operation in connection with the signals which are transmitted by the detectors 3b, 4b and 3c, 4c, i.e., the integrating circuit 11 for green color receives from the output 9b of the computer 9 a signal corresponding to that transmitted by the element 3b (if the difference between the signals from 3b and 4b is less than the reference value C) or a signal corresponding to that transmitted by the element 4b (if the difference between the intensities of signals from 3b and 4b exceeds the value C). The integrating circuit 12 for red color receives signals from the output 9c of the computer 9, and the transmitted signal corresponds to that furnished by the element 3c if the difference between the intensities of signals transmitted by 3c, 4c is less than C or to that furnished by the element 4c if the just discussed difference exceeds C. The same applies for the elements 4a–4c and 5a–5c, 5a–5c and 6a–6c, 6a–6c and 7a–7c as well as 7a–7c and 8a–8c. In other words, it can happen (e.g., if the leading marginal portion of the frame 1b exhibits only a blue color representing an image of the sky) that, upon completion of the first stage of the monitoring operation (of the leading marginal zone including the fields 3–8 of the frame 1b), the integrating circuit 10 stores a single signal corresponding to that transmitted by the element 3a, the integrating circuit 11 stores a single signal corresponding to that transmitted by 3b, and the integrating circuit 12 stores a single signal corresponding to that transmitted by the element 3c.

The reference value C may be different for each of the primary colors blue, green and red.

It will be noted that the just described operation of the computer 9 actually amounts to a determination whether or not two neighboring fields (e.g., 3 and 4) bear portions of the image of one and the same subject or item.

The sprocket wheel 17 thereupon advances the film 1 by a step so as to place the fields 3A–8A into register with the respective monitoring elements 3a–8c. It is clear that it is equally possible to move the battery of elements 3a–8c with respect to the film 1. The computer 9 then begins to compare the results of measurements of the field 3 (in each of the primary colors) with the results of measurements of the field 3A. The output 9a transmits a signal to the circuit 10 only if the difference between the measurements of fields 3 and 3A exceeds the selected reference value for the color blue. The same applies for the transmission of signals via outputs 9b and 9c (i.e., to the circuits 11 and 12). Thus, the computer 9 compares the results of measurements of all neighboring fields (as considered in as well as at right angles to the direction of relative movement between the film 1 and the evaluating apparatus). The sample-and-hold amplifiers 18 continue to store signals denoting the results of measurements of the color densities of fields 3–8 so that the computer 9 can complete the necessary comparisons between the fields 3 and 3A, 4 and 4A, etc. while the fields 3A–8A register with the elements 3a–8c.

If the results of measurements of the fields 3 and 3A deviate by more than C, the results of measurements of the field 3A are not immediately transmitted to the corresponding circuit or circuits 10, 11 and 12. The computer 9 then proceeds with a comparison of the results of measurements of the fields 3A and 4A. If the difference exceeds C, the results of measurements of the field 3 are transmitted to the circuits 10-12. The computer 9 thereupon compares the results of measurements of the fields 4 and 4A. If the difference exceeds C, the results of measurements of the field 4 are transmitted to the circuits 10-12 and the amplifiers 18 for the elements 4a-4c store signals denoting the results of measurements of the field 4A. The same procedure is repeated until the computer 9 completes the comparison of the results of measurement of the last field 8G with the neighboring fields 7G and 8F. In each instance, the outputs 9a-9c of the computer 9 transmit signals denoting the first results of measurements or the results which deviate from the results of measurements of neighboring fields by a value exceeding C.

The outputs of the circuits 10 to 12 are connected with the corresponding inputs of a control circuit 13 which determines the duration of exposure of each frame 1b to light in a particular color in such a way that the sum of colors of the images of those fields whose results of measurements were transmitted to the circuits 10-12 amounts to an uncolored grey. The control circuit 13 actuates electromagnets 14, 15, 16 which respectively move a subtractive filter for blue, green and red color across the path of copying light when the exposure of photographic paper in the respective color should be completed. A copying machine which can be used in combination with the control circuit 13 is disclosed, for example, in German Pat. No. 972,204. The exact manner in which the signals transmitted by the circuits 10-12 are utilized to control the operation of a suitable color copying machine form no part of the invention. For example, the quantity of copying light in each of the primary colors can be determined by regulating the intensity of light, e.g., by replacing a beam of white copying light with a beam which is partially colored.

By way of example, each frame 1b can be broken up into one hundred imaginary unit areas or fields, and the density of each such field is monitored in the colors blue, green and red. The computer 9 ascertains that the image of an item in the image on the frame 1b is the sum of all such neighboring fields wherein the results of measurements are identical or deviate from each other by less than the reference value C. The computer proceeds systematically by starting with the comparison of neighboring fields in several directions. This insures that the computer ascertains the size and boundaries of an item which causes the negative to exhibit subject failure.

If the reference value C is not constant, it can be selected in such a way that it denotes the average density of the frame or the corresponding field, i.e., one third of the sum of the results of density measurements of a field in the three primary colors. This takes into account different slopes of curves in various density ranges. It is also possible to select for each color an empirically determined reference value, i.e., a reference value which can be different for each of the three primary colors. When the evaluation of all fields is completed, each item of the image on the corresponding frame is considered, at least to a certain extent, i.e., items in dominant colors are not disregarded in their entirety. As a rule, each such item is represented by the results of measurements of one of its fields.

The same method can be utilized for density correction. Thus, one can ascertain the average density of each item, and the results of such measurements are utilized to ascertain the corrected average density of all items in a color negative. The resulting value is compared with the average density of a normal negative and the difference is utilized as a reference value.

An important advantage of the improved method and apparatus is that they allow for accurate and reliable determination of all parts of an original which exhibit a dominant color. This renders it possible to consider each such part during reproduction of the image of the respective original; however, the consideration involves only a single unit area (field) of the corresponding part of the original, irrespective of the overall dimensions of the item which exhibits a dominant color.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A method of evaluating color photographic negatives prior to integral copying, comprising the steps of photoelectrically measuring the density of each of a plurality of unit areas of a negative in each of the primary colors; comparing the results of measurements of neighboring unit areas in each of said colors; and storing only one of the results when the difference between the results of measurements of two neighboring unit areas is below a predetermined value preparatory to utilizing the stored results for selection of the amounts of light in the respective colors during copying.

2. The method of claim 1, wherein said predetermined value is a function of the average grey density of the negative.

3. The method of claim 1, wherein said predetermined value is different for each of said colors.

4. The method of claim 1, wherein said storing step includes separately storing the results of measurements in each of said colors and totalizing the stored results in each of said colors preparatory to so selecting the amounts of copying light in said colors that the sum of colors in the reproduction of those unit areas whose results of measurements were stored amounts to neutral grey.

5. The method of claim 1, wherein the sum of said unit areas equals the entire area of the negative.

6. The method of claim 1, wherein each of said unit areas neighbors at least two other unit areas.

7. The method of claim 1, wherein said negative is an exposed and developed color film frame and said measuring step includes simultaneously measuring the density of several unit areas.

8. Apparatus for evaluating color photographic negatives prior to integral copying, comprising means for photoelectrically measuring the density of each of a plurality of unit areas of a color negative in each of the primary colors; means for comparing the results of measurements of neighboring unit areas and for transmitting signals denoting the results of measurements in each of said colors for one of such neighboring unit areas when the difference between the results of measurements of neighboring unit areas is less than a predetermined value; means for effecting relative movement between the negative and said measuring means; and means for storing said signals for each of said colors.

9. The apparatus of claim 8, wherein said comparing means comprises a computer having discrete outputs for transmission of signals for each of said colors.

10. The apparatus of claim 8, further comprising means for temporary storage of the results of measurements intermediate said measuring means and said comparing means.

* * * * *